March 7, 1972 — E. J. RUSSELL — 3,647,644
BEAM LEAD BONDING PROCESS
Filed Nov. 7, 1969 — 3 Sheets-Sheet 1
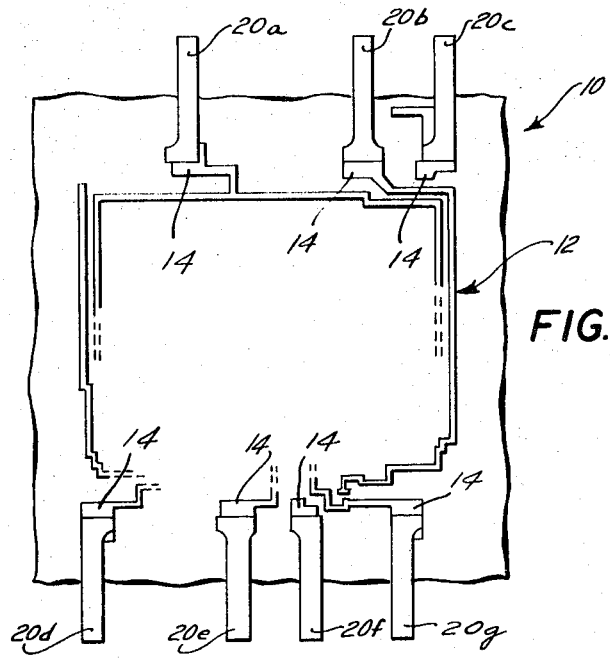
FIG. 1
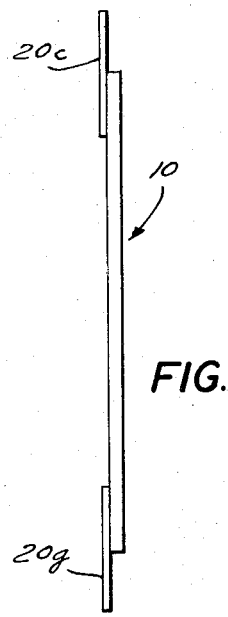
FIG. 2
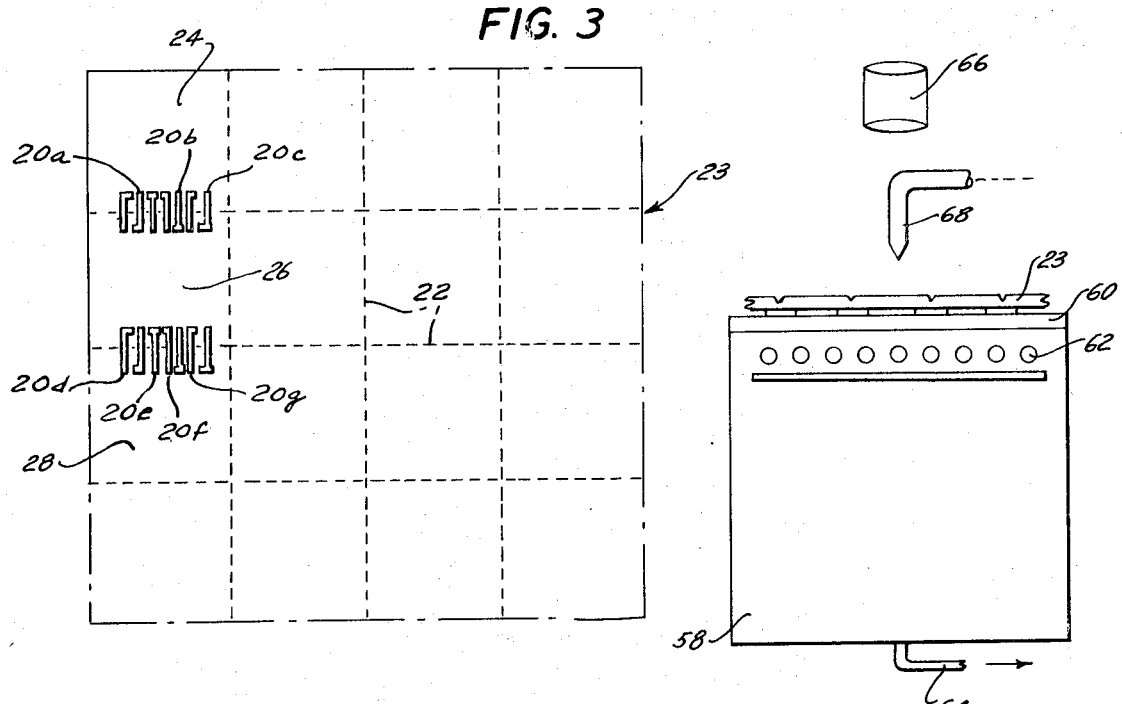
FIG. 3
FIG. 4
INVENTOR
EDWARD J. RUSSELL
BY James and Franklin
ATTORNEY March 7, 1972 — E. J. RUSSELL — 3,647,644
BEAM LEAD BONDING PROCESS
Filed Nov. 7, 1969 — 3 Sheets-Sheet 2
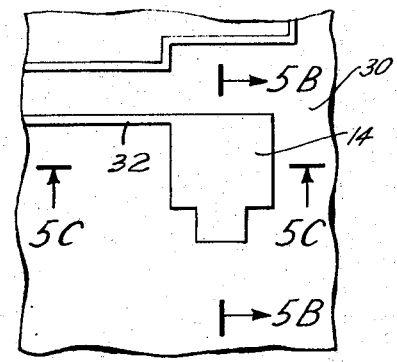
FIG. 5A
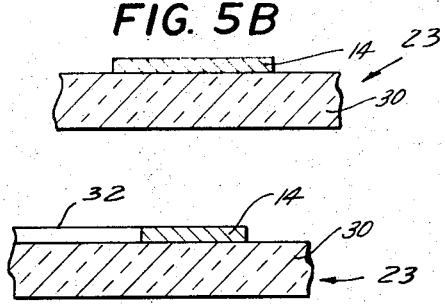
FIG. 5B
FIG. 5C
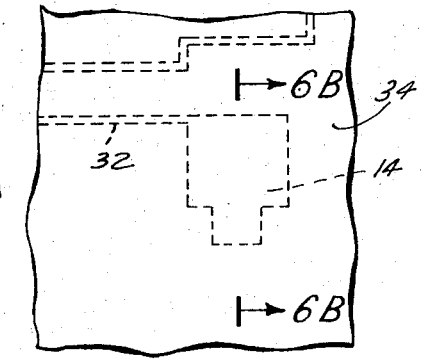
FIG. 6A
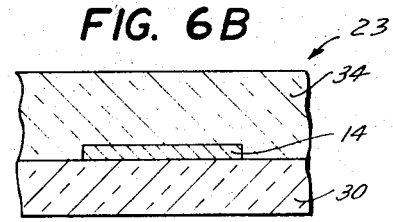
FIG. 6B
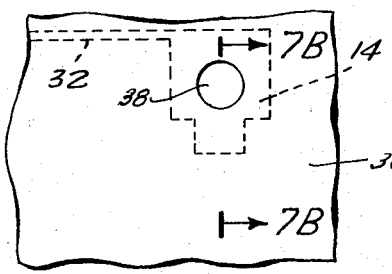
FIG. 7A
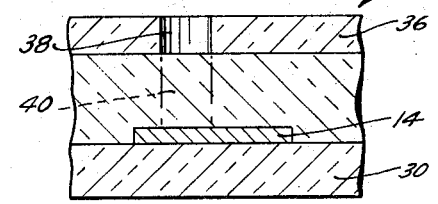
FIG. 7B
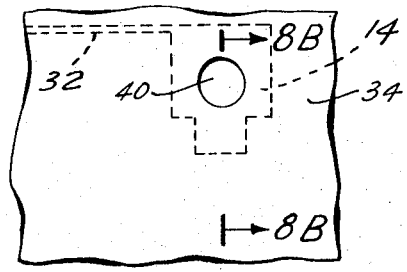
FIG. 8A
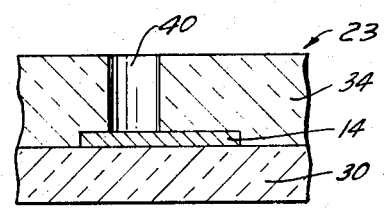
FIG. 8B
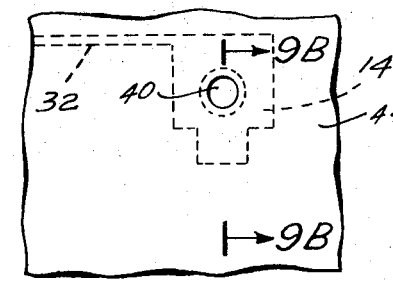
FIG. 9A
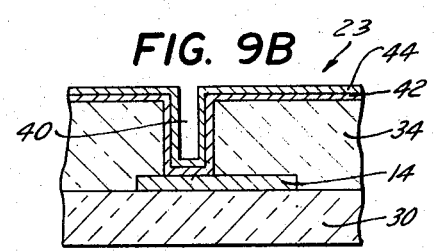
FIG. 9B
INVENTOR
EDWARD J. RUSSELL
BY James and Franklin
ATTORNEY March 7, 1972  E. J. RUSSELL  3,647,644
BEAM LEAD BONDING PROCESS Filed Nov. 7, 1969  3 Sheets-Sheet 3

INVENTOR
EDWARD J. RUSSELL
BY James and Franklin
ATTORNEY

United States Patent Office 3,647,644
Patented Mar. 7, 1972

3,647,644
BEAM LEAD BONDING PROCESS
Edward J. Russell, Salt Lake City, Utah, assignor to
General Instrument Corporation, Newark, N.J.
Filed Nov. 7, 1969, Ser. No. 874,829
Int. Cl. B01j 17/00; B29c 17/08; C23b 5/48
U.S. Cl. 204—15
23 Claims

ABSTRACT OF THE DISCLOSURE

A method of forming a beam lead on a wafer of semiconductor material containing a plurality integrated circuits in which the beam lead is deposited on a layer of conductive material whereby it becomes physically bonded and electrically connected to the conductor pad of one of such integrated circuits and overlays said wafer outside said one circuit. Bonding to the conductive material outside said one circuit is inhibited by chemical treatment of such conductive material. Hence the wafer of semiconductor material may be divided readily into a plurality of chips each having beam leads attached thereto and extending therefrom in cantilever fashion. Also disclosed is a method of scribing the backside of said wafer remote from said beam leads such that the wafer may be broken into a plurality of chips along lines spanned by said beam leads. This is accomplished by directing infrared radiation through said wafer to establish a pattern indicating, on the backside of the wafer, the position of the beam leads or other circuit components located on the front side of the wafer.

---

The present invention relates to a method of forming a beam lead on a wafer of semiconductor material and a method of dividing said wafer into individual chips of semiconductor material each containing a discrete integrated circuit.

In recent years, a new technology has been developed in which a plurality of circuit elements are fabricated in an integrated fashion, that is, by forming them in a circuit which can be substantially completely fabricated in a very small physical element such as a chip of semiconductor material. Integrated circuits of this type are particularly useful in electronic digital computer circuitry in which they may be electrically connected to form more complex logic circuit arrays. Each of such chip circuits terminates in a plurality of conductor pads usually positioned near the outer edges of the chip. In accordance with one type of manufacture, beam leads of a suitable conductive material are electrically and physically connected to the conductor pads and extend outwardly from the chip. The circuits are thus adapted to be electrically connected in any desired circuit array.

In the fabrication of these integrated circuit chips it has been found particularly effective to utilize field effect transistors (FET's) which are extremely effective as high speed switching devices. Particularly useful in modern computer circuitry are the recently developed integrated circuits of the metal oxide semiconductor type, known as MOS circuits. Such circuits comprise a semiconductor substrate, usually of silicon and primarily of a given type, in which areas of the opposite conductivity type are formed. MOS-type devices further include an insulating layer, usually of a metal oxide such as silicon dioxide, which covers the surface of the substrate where the portions of different conductivity types are exposed, and through which openings are formed so that appropriate ohmic electrical connection may be made to designated portions of that surface.

In the fabrication of integrated circuits of this type, and in particular in forming openings in the oxide insulating layer in registry with a particular portion of the substrate below, a photo dissolution technique has been found very effective. Briefly, the technique consists of applying a layer of photo-resist material to the surface of the insulating layer. Photo resist material has the characteristic of changing its solubility properties with respect to certain chemical solvents when exposed to light rays. Light is then directed through a suitable mask, usually in the form of a photographic negative, onto the resist material. The exposed or unexposed portion of such material (depending on the polarity type of the resist) is accordingly developed, rendered soluble and removed by a suitable solvent, leaving an opening in the resist material. A suitable etchant is then deposited in the opening and removes that portion of the oxide layer below the opening in the resist layer. The resist material is then removed using a commercial stripper, leaving an opening in the insulating layer in registry with a portion of the semiconductor substrate. That opening may in turn be used in various ways, e.g., to remove material which it exposes, to diffuse substances into the exposed areas, or to make electrical connection to the exposed areas.

Integrated circuits of this type are normally mass produced on a relatively large wafer of semiconductor material containing thousands of such circuits, each integrated on a small chip area of the wafer. In conventional manufacture, a beam lead is deposited on the wafer such that one end is in electrical connection with a conducting pad on one chip area and the other end extends beyond the chip area overlaying a zone of unused semiconductor material. The wafer is separated into a plurality of individual chips by etching through the zone of unused semiconductor material, without etching the beam leads, whereby the wafer is separated along such unused zones into individual chips having beam leads extending from the chip edges in cantilever fashion.

A primary disadvantage of this method of fabrication is that a large portion of semiconductor material, namely the unused zones, are completely wasted and destroyed in the etch process. A typical beam lead formed on a square chip of this type extends beyond the chip approximately ten percent of its side dimension. Thus, ten percent of the semiconductor wafer must be etched away in the formation of individual semiconductor chips. The conventional process is thus costly and inefficient in an area in which efficiency is of primary importance, namely the active utilization of the entire semiconductor substrate.

It is a primary object of the present invention to devise a method of fabricating a plurality of integrated circuits with attached beam leads on a wafer of semiconductor material in which a minimum of semiconductor material is wasted upon separation of the wafer into individual chips. In accordance with the present invention individual chip areas are formed on the wafer substantially contiguous to each other with virtually no unused zone between them. The beam leads, however, must extend out appreciably from their respective chip areas in order that external electrical connections can be made thereto. With this configuration it is necessary to devise a method of bonding a beam lead on to the chip area of one circuit and yet prevent it from bonding on, or adhering to, the chip area of an adjacent circuit, whereby the wafer may be separated into individual chips along narrow lines despite the fact that the beam leads still extend out from the edges of each chip in cantilever fashion. In accordance with the present invention, the above problem is solved by chemically treating that portion of an adjacent chip area on which is positioned the cantilever portion of the beam lead of an adjacent chip area.

It is another object of the present invention to devise method of forming beam leads on a plurality of circuits integrated on a wafer of semiconductor material using the same photo dissolution technique as that employed in fabricating the circuits themselves.

Another important advantage flowing from my beam lead bonding process is a substantial simplification of the technique of separating the semiconductor wafer into individual chips. As previously mentioned, the conventional method employed in the fabrication of individual semiconductor chips containing cantilevered beam leads is to etch out the unused zones of semiconductor material between adjacent chip areas of the wafer thereby freeing the cantilevered portion of the beam leads. The etchant is applied through a pattern of photo resist material created by using the photo dissolution technique, discussed above, on the backside of the wafer. This process is both time consuming and expensive, especially in view of the extremely small proportions which must be dealt with.

It is therefore another object of the present invention to devise a method of scribing a wafer of semiconductor material containing a plurality of integrating circuits on the surface opposite that on which the circuits are integrated. This is accomplished by directing the infrared radiation through the wafer from the front side on which the circuits are integrated to the backside which is to be scribed. Because the semiconductor material is transparent to such radiation and the beam leads and other components of the circuits are opaque to such radiation, a pattern corresponding to the positioning of the circuits on the opposite surface may be detached on the surface to be scribed. The pattern is then converted into a visible reference means so that the wafer may be scribed along the desired lines.

To the accomplishment of the above, and to such other objects as may hereinafter appear, the present invention relates to a method of forming beam leads on a wafer of semiconductor material and a method of scribing said wafer to facilitate dividing it into a plurality of individual semiconductor chips, as described in the specification, taken together with the accompanying drawings in which:

FIG. 1 is a plan view of an individual semiconductor chip containing an integrated circuit (only partially shown) with beam leads projecting from said chip;

FIG. 2 is a side view of the chip of FIG. 1;

FIG. 3 is an enlarged view schematically illustrating a small portion of a wafer of semiconductor material in accordance with this invention showing overlapping beam leads on one chip area in interleaved relationship with two adjacent chip areas;

FIG. 4 is a side view of a wafer in accordance with the present invention positioned on apparatus for directing infrared radiation through said wafer and schematically illustrating means for detecting said radiation and means for scribing said wafer;

FIGS. 5–13 show a small portion of a wafer of semiconductor material at the various stages of the process of this invention;

FIG. 5A is a fragmentary plan view of a portion of a wafer in accordance with the present invention, corresponding to the portion of the wafer shown in FIG. 3 in the vicinity of beam lead 20d and showing a conductor pad and lead lines;

FIG. 5B is a cross-sectional view along line 5B—5B of FIG. 5A;

FIG. 5C is a cross-sectional view along line 5C—5C of FIG. 5A;

FIG. 6A is a fragmentary plan view of the wafer portion of FIG. 5A with an overlay of insulating material, the conductive pad and lead lines shown in dotted lines;

FIG. 6B is a cross-sectional view along line 6B—6B of FIG. 6A;

FIG. 7A shows the wafer portion of FIG. 6A with an overlay of photo-resist material in which an opening has been formed in registry with the conductor pad;

FIG. 7B is a cross-sectional view along line 7B—7B of FIG. 7A;

FIG. 8A is a fragmentary plan view of the wafer portion of FIG. 7A with the photo-resist overlay removed and a hole in the insulating material in registry with the conductor pad;

FIG. 8B is a cross-sectional view along the line 8B—8B of FIG. 8A;

FIG. 9A is a fragmentary plan view of the wafer portion of FIG. 8A with successive overlays of titanium and gold;

FIG. 9B is a cross-sectional view along line 9B—9B of FIG. 9A;

FIG. 10A is a fragmentary plan view of the wafer portion of FIG. 9A with an overlay of photo-resist material in the vicinity of the opening in the insulating layer;

FIG. 11A is a fragmentary plan view of the wafer portion of FIG. 10A with the photo-resist material and a portion of the gold overlay corresponding to the exposed portion shown in FIG. 10B removed;

FIG. 11B is a cross-sectional view along the line 11B—11B of FIG. 11A;

FIG. 12B is a cross-sectional view along the line 12B—12B of FIG. 12A;

FIG. 13A is a plan view of the wafer portion of FIG. 12A with a beam lead bonded to the gold layer and overlaying the elongated previously exposed portion of the titanium layer;

FIG. 13B is a cross-sectional view along the line 13B—13B of FIG. 13A, showing a dotted line along which the wafer is to be broken; and FIG. 13C is a sectional view identical to that of FIG. 13B with the exception that the wafer has been broken along the dotted line thereof so that the beam lead extends from the chip in cantilever fashion.

Figure 10:
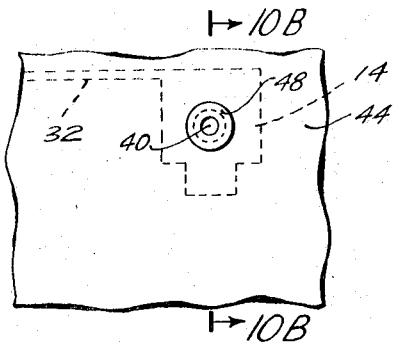
Figure 10B:
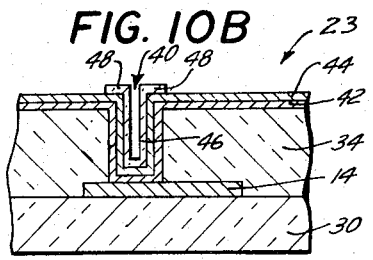
FIG. 10B is a cross-sectional view along the line 10B—10B of FIG. 10A.
Figure 11:
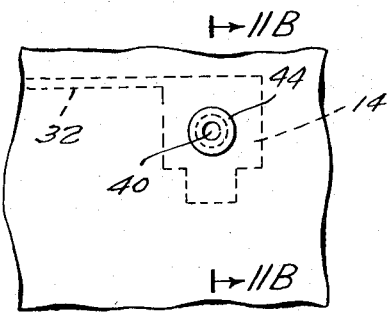
Figure 11:
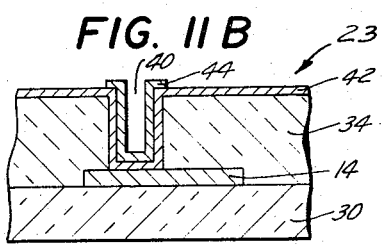

The present invention will be described specifically with respect to a preferred embodiment thereof, it being recognized that various steps in the process and the materials used therein may be varied without departing from the scope of the invention.

FIG. 1 shows a semiconductor chip generally designated 10 fabricated in accordance with the present invention. The circuit generally designated 12 (only partially shown) is integrated on said chip and terminates in a plurality of conductor pads 14. Beam leads 20 are bonded to the conductor pads 14 at one end and, as best shown in FIG. 2, overlay the chip and extend in cantilever fashion from the outer edges of the chip at its other end.

FIG. 3 shows an enlarged portion of wafer 22 out of which a plurality of chips similar to that shown in FIG. 1 are broken. Chip areas 24, 26 and 28 situated in the upper lefthand corner of said wafer portions show the intermeshing relationship of beam leads 20 when formed on wafer 22. As best seen in FIG. 1 the beam leads are enlarged at their ends connected to conducting pads 14. For convenience chip area 26 is shown in FIG. 3 as corresponding to individual chip 10 in FIG. 1. It can be seen that in FIG. 3 beam leads 20a, 20b and 20c are electrically connected to the circuits of chip area 26, extend across the boundary between chips 26 and 24, and overlay the surface of chip 24. Likewise beam leads 20d, 20e, 20f and 20g are electrically connected to the circuit of chip area 26, extend beyond the boundary between chip 26 and chip 28, and overlay the boundary of chip 28.

The method of the present invention will now be described with reference to FIGS. 5 through 13.

FIG. 5 shows an enlarged fragmentary portion of the wafer of FIG. 3 which carries conductor pad 14. For convenience, the beam lead forming process is illustrated in FIGS. 5–13 with respect to a portion of wafer 23 corresponding to that on which lead 20g is formed. As best shown in FIG. 5B the main body of the wafer comprises a substrate of semiconductor material 30 on which the conductor pad 14 is located. Conductor pad 14 is electrically connected to the integrated circuit (not shown) by means of a conductive lead line 32 (FIG. 5A).

The first step in the process of this invention is illustrated in FIG. 6. An overlay 34 of insulating material such as silicon dioxide, is applied to wafer 23. As shown in FIG. 6B, conductor pad 14 is now sandwiched between substrate 30 and insulating layer 34. The outline of conductor pad 14 is accordingly shown in dotted lines in the plan view of FIG. 6A.

Next, a layer of photo-resist material 36 is applied atop the insulating layer 34. The photo-resist material 36 may be any conventional resist material such as "Kodak Metal Etched Resist" (KMER). As shown in FIG. 7B a hole 38 is formed in the layer of photo-resist in registry with a portion of conductor pad 14. This is done by a conventional photo dissolution technique. A suitably masked pattern of light is directed at the surface of the photo-resist layer. The portion exposed to light corresponding to hole 38 is developed and made soluble by a chemical developer such as "Kodak Thin Film Resist Developer." After that soluble resist portion has been rinsed away it leaves hole 38 and exposes a portion of the silicon dioxide layer 34, as shown in FIGS. 7A and 7B. Using hole 38 as a stencil, a corresponding hole 40 is formed in the oxide layer 34 by means of an oxide etch utilizing a standard buffered hydrofluoric acid. The photo-resist layer 36 is then removed or stripped by conventional methods leaving a portion of conductive pad 14 corresponding to hole 40 exposed, as shown in FIGS. 8A and 8B. The exposed surface of conductor pad 14 is then cleaned by means of a premetal etch in preparation for the next step.

As best shown in FIG. 9B successive layers of titanium 42 and gold 44 are then applied to the relevant exposed surface of wafer 23 including the exposed portion of conductor pad 14 by an evaporation technique well known in the art. Layers 42 and 44 are conductive and are in electrical as well as physical connection with conductor pad 14.

Utilizing the same photo dissolution technique described in connection with the formation of hole 38 above (this time with an opposite polarity resist) a thimble-shaped layer of photo-resist material 46, including flange 48, is formed on the layer of gold 44 completely within hole 40, the flange 48 extending out radially beyond the hole 40 (see FIGS. 10A and B).

Photo-resist layer 46 again serves as a stencil, this time for the dissolution of the exposed portion of gold layer 44. The etchant applied to the exposed portion of gold layer 44 as this point in the process accomplishes two results: First, it eats away the exposed portion of gold layer 44, thereby exposing titanium layer 42. In addition, and most importantly, it poisons titanium layer 42 with respect to gold; that is, the surface of the exposed portion of titanium layer 42 becomes oxidized and thus resistant to physical adherence to gold. Any of the known compositions which will etch gold and oxidize titanium may be used at this point in the process. I have found that an aqueous solution of a potassium composition is particularly effective for this purpose. In a typical example an aqueous solution of potassium cyanide (35 grams per 500 cc. of $H_2O$) is applied to the exposed surface of gold layer 44 of 7,000–10,000 A. thickness, at a temperature of approximately 40° C. Within approximately two to three minutes the exposed surface of gold layer 44 will have been etched away and the potassium cyanide will have oxidized titanium layer 42. Similar results will be obtained with an aqueous solution of potassium iodide and iodine consisting of 35 grams of potassium iodide and 10 grams of iodine per 100 mililiters of $H_2O$. The significance of this poisoning effect will become apparent from the description of the formation of the beam lead. Flanges 48 of resist layer 46 serve to inhibit any possible seepage of the cyanide etchant between the continuous layer of resist material 46 and gold 44 so that the portion of gold layer 44 within hole 40 remains firmly bonded to titanium layer 42 after the cyanide ethant is applied. The remaining portion of photo-resist layer 46 is again removed leaving the configuration shown in FIG. 11B.

Figure 12A:
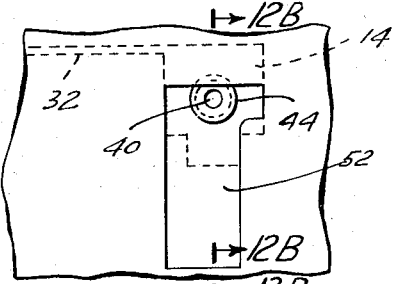
FIG. 12A is a plan view of the wafer portion of FIG. 11A with an overlay of photo-resist material and an elongation opening therein exposing a portion of the gold and titanium layers on which the beam lead is to be deposited.
Figure 12:
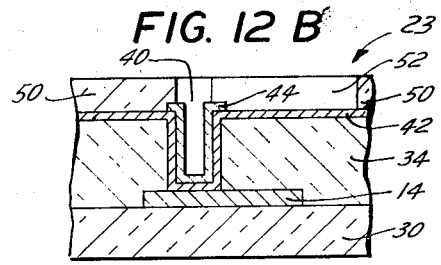
Figure 13:
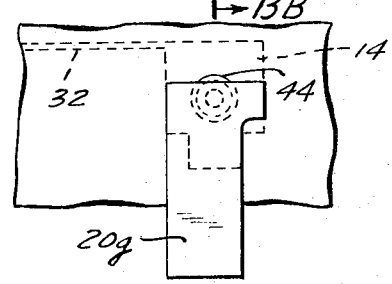
Figure 13:
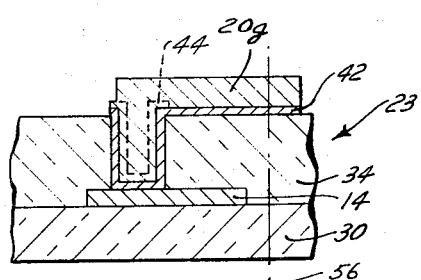
Figure 13:
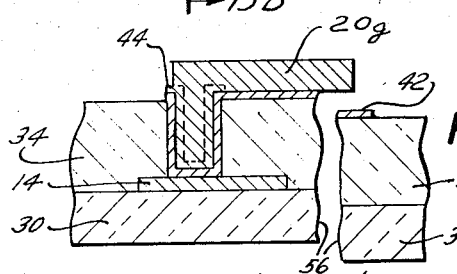

The portion of wafer 23 shown in FIG. 11B is now ready for the formation of a gold beam lead. Utilizing the photo dissolution technique described above, a layer of photo-resist material 50 is applied to wafer 23 and an elongated opening 52 shown in plan view in FIG. 12A and in section in FIG. 12B is formed therein. As best shown in FIG. 12B, opening 52 in photo-resist layer 50 together with hole 40 form, in effect, an L or keyhole-shaped mold adapted to receive and form a beam lead of corresponding shape. Gold is thus deposited in said L-shaped mold by conventional electrodeposition means. The thus deposited gold forms beam lead 20g. The resist layer 50 and the exposed titanium is then removed, leaving wafer 23 and attached beam lead 20g in the configuration shown in FIGS. 13A and 13B.

A plurality of beam leads such as shown in the fragmentary views of FIGS. 13A and 13B are positioned substantially as shown in FIG. 3 as previously described. Beam lead 20g and conductive layer 44 are of the same material, namely gold, and thus layer 44 after deposition of beam lead 20g is shown in dotted lines in FIG. 13B to more clearly indicate that beam lead 20g has bonded to and become integral with gold layer 44. As described above, however, titanium layer 42 has been treated with a cyanide etch adapted to inhibit physical adherence between titanium and gold. It therefore will be apparent that while gold beam lead 20g overlies and is contiguous to titanium layer 42, it remains physically unattached thereto. Thus, if wafer 23 is severed along dotted line 56, the portion of beam lead 20g to the right of dotted line 56 as shown in FIG. 13B will readily separates from titanium layer 42, as is clearly shown in FIG. 13C.

While in the preferred embodiment specifically described the beam leads 20 are deposited on and bonded to gold layer 44, which is in turn bonded to titanium layer 42, it is possible to eliminate layer 44 and deposit the beam lead directly on treated and untreated portions of titanium layer 42. Utilization of the gold layer is preferred because it produces a firm physical bonding upon electrodeposition of the beam lead and thus a more satisfactory electrical connection to the conductor pad.

In order to separate wafer 23 into individual chips such as chip 10 in FIG. 1, wafer 23 must be scribed along lines 22 shown in FIG. 3. In conventional fabrication of semiconductor chips without beam leads, scribing is performed on the surface of the wafer containing the integrated circuits by visual reference to such circuits, generally utilizing a microscope. The wafer is then readily separable along the scribe lines into individual semiconductor chips.

It will be readily apparent that a wafer, such as wafer 23 formed in accordance with the process described above, is not conducive to this method of scribing since the beam leads 20 are formed on the wafer in a position spanning adjacent chip areas, that is spanning the lines along which the wafer would normally be scribed.

Accordingly, I have devised a novel method of scribing a wafer of semiconductor material made in accordance with my beam lead bonding process described above, on the surface opposite that containing the integrated circuit components including the preformed beam leads. Apparatus for carrying out this method is shown in FIG. 4. Wafer 23 is positioned on chamber 58 with the surface containing beam leads 20 face down. Chamber 58 comprises conventional means for generating infrared radiation including a plexiglass surface 60 and bulb array 62. In operation chamber 58 is evacuated by means of conduit 64. A viewer 66 is positioned above wafer 23. Said viewer comprises a microscope with a known infrared converter for converting infrared radiation to visible light. Both silicon substrate 30 and the overlay of silicon dioxide 34 will freely transmit infrared radiation, that is, both materials are transparent to infrared light waves. On the other hand, the circuit components including beam leads 20, will block the passage of infrared radiation, absorbing and reflecting substantially all of it. In other words, these components are opaque to infrared light waves. With these properties in mind it will be apparent that an operator viewing wafer 23 through viewer 66 will see a pattern of visible light with dark areas corresponding to the circuit components. With this pattern as a reference, the operator may proceed to scribe the backside of wafer 23 along lines appropriate for breaking said wafer into individual chips such as chip 10 in FIG. 1 but without actually cutting across the beam leads 20 themselves. As schematically illustrated in FIG. 4, the wafer is scribed only to a depth sufficient to form a break line along which the wafer may be cleanly severed; thus very little of the semiconductor material is wasted and substantially all of it is available for active use in the integrated circuits. Moreover, by scribing rather than etching, the several steps of the photo dissolution technique previously described are eliminated.

One of the important considerations in the fabrication of beam leads of the type described is the insulation of the lead from the semiconductor substrate. It will be apparent that a beam lead formed in accordance with the present invention overlies the insulating layer 34 as it extends out to the edge of the chip. The scribing process described above in no way jeopardizes this insulation since the scribe line will not penetrate into the insulating layer 34.

The present invention provides an efficient and inexpensive method of mass producing integrated circuits on semiconductor chips of the type in which beam leads extend from the chip in cantilever fashion. Unlike conventional processes, the process of the present invention wastes no more than a negligible amount of the semiconductor wafer in fabricating individual chips. Moreover, this is accomplished utilizing the same conventional photo dissolution techniques used in fabricating the components of the circuits themselves.

While only one embodiment of the present invention has been disclosed, it will be apparent that many variations may be made therein, all within the scope of the present invention.

We claim:
1. The method of forming a beam lead of a given material on a substrate of semiconductor material and electrically and physically connecting it to a conducting pad of a circuit integrated on said substrate, comprising the steps of:
   (1) coating said substrate with an overlay of insulating material;
   (2) forming an opening through said insulating material in registry with and extending through to said conducting pad to thereby expose its surface;
   (3) coating said insulating material and the exposed surface of said conducting pad with a layer of conducting material on which said given material can be deposited and to which said given material will normally adhere;
   (4) treating a portion only of said conducting material so as to inhibit the adherence of said given material thereto, the untreated portion of said conducting material overlying said conducting pad surface in the area of said opening in said insulating material;
   (5) depositing said given material on treated and untreated portions of said conducting material, thereby to form said beam lead, whereby said beam lead is physically attached only to said untreated portion of said conducting material.

2. The method of claim 1, wherein step (4) comprises:
   (4a) coating said layer of conducting material with a layer of photo resist material;
   (4b) subjecting said layer of photo resist material to a masked pattern of radiation, said pattern being shaped to correspond to the desired shape of said untreated portion of said conducting material;
   (4c) removing a portion of said photo resist material in accordance with said masked pattern, thereby to delineate said portion of said conducting material;
   (4d) treating said delineated portion of said conducting material so as to inhibit the adherence of said given material thereto; and
   (4e) removing the remainder of said photo resist material.

3. The method of claim 1, wherein said given material is adhered to the untreated portion of said conducting material by means of electrodeposition.

4. The method of claim 1, wherein said given material is gold.

5. The method of claim 1, wherein said conducting material is titanium.

6. The method of claim 4, wherein said conducting material is titanium.

7. The method of claim 5, wherein said conducting material is treated with cyanide.

8. The method of forming a beam lead of a given material on a substrate of semiconductor material and electrically and physically connecting it to a conducting pad of a circuit integrated on said substrate comprising the steps of:
   (1) coating said substrate with an overlay of insulating material;
   (2) forming an opening through said insulating material in registry with an extending through to said conductor pad to thereby expose its surface;
   (3) coating said insulating material and the exposed surface of said conductor pad with a layer of first conducting material on which said given material can be deposited and to which said given material will normally adhere;
   (4) coating said layer of first conducting material with a layer of second conducting material on which said given material can be deposited and to which said given material will normally bond;
   (5) removing all but a portion of said layer of said second conducting material to expose a portion of said layer of first conducting material, the remaining portion of said second conducting material overlying said layer of first conducting material in the area of said opening in said insulating material;
   (6) treating said exposed portion of said first conducting material so as to inhibit the adherence of said given material thereto;
   (7) depositing said given material on exposed layers of said first and second conducting material, thereby to form said beam lead, whereby said given material is bonded only to said second conducting material.

9. The method of claim 7, wherein step (5) comprises:
   (5a) coating said layer of second conducting material with a layer of photo resist material;
   (5b) subjecting said layer of photo resist material to a masked pattern of radiation, said pattern being shaped so as to correspond to the desired shape of said remaining portion of said layer of said second conducting material;
   (5c) removing a portion of said photo resist material in accordance with said masked pattern, thereby to delineate said portion of said second conducting material;
   (5d) removing said delineated portion of said second conducting material to expose a portion of said first conducting material; and
   (5e) removing the remainder of said photo resist material.

10. The method of claim 8, wherein step (5c) is accomplished by means of an etchant which is also effective to accomplish step (6).

11. The method of claim 9, wherein said etchant is an aqueous solution of potassium cyanide.

12. The method of claim 7, wherein said given material is bonded to said second conducting material by means of electrodeposition.

13. The method of claim 7, wherein said given material is the same as said second conducting material.

14. The method of claim 7 wherein said given material is gold.

15. The method of claim 7, wherein said first conducting material is titanium.

16. The method of claim 7, wherein said first conducting material is treated by subjecting it to an aqueous solution of potassium cyanide.

17. The method of treating the other surface of the wafer of claim 16, in which said circuits are not visible on said other surface and wherein said semiconductor material displays properties, with regard to the transmission of radiant energy, different from at least some of the components of said circuit, comprising the steps of directing said given form of radiant energy through said wafer from said one surface to said other surface to produce a pattern detectable on said other surface; and treating said other surface of said wafer along lines determined by reference to said detectable pattern, thereby to provide visible reference means on said other surface to facilitate dividing said wafer into individual chips.

18. The method of claim 17, in which said given form of radiant energy is not visible to the human eye, and further comprising the step of converting said non-visible pattern to a visible pattern.

19. The method of claim 18, in which said given radiant energy is infrared radiation, said semiconductor material being transparent to infrared radiation and said beam leads being opaque to infrared radiation.

20. The method of claim 17, in which said given radiant energy is infrared radiation, said semiconductor material being transparent to infrared radiation and said beam leads being opaque to infrared radiation.

21. The method of claim 17, in which said step of treating comprises scribing said surface, and said visible reference means comprises scribe lines which physically facilitate dividing said wafer into individual chips.

22. The method of claim 20, comprising the step of scribing said surface along lines determined by reference to said visible reference means.

23. The method of claim 17, comprising the step of scribing said surface along lines determined by reference to said visible reference means.

References Cited

UNITED STATES PATENTS

| | | | |
|---|---|---|---|
| 3,388,048 | 6/1968 | Szabo, Jr. | 204—15 |
| 3,507,756 | 4/1970 | Wenger | 204—15 |
| 3,514,379 | 5/1970 | Neill | 204—15 |
| 3,550,261 | 12/1970 | Schroeder | 29—583 |
| 3,574,932 | 4/1971 | Wilson | 29—583 |

JOHN H. MACK, Primary Examiner

T. TUFARIELLO, Assistant Examiner

U.S. Cl. X.R.

29—583; 156—3, 7

UNITED STATES PATENT OFFICE
CERTIFICATE OF CORRECTION

Patent No. 3,647,644  Dated March 7, 1972

Inventor(s) E. J. Russell

It is certified that error appears in the above-identified patent and that said Letters Patent are hereby corrected as shown below:

Column 10, lines 12-14 should be cancelled and the following claim 22 inserted instead therefor.

-- 22. In connection with a wafer of semiconductor material for use in making integrated circuits on individual chips of such material, comprising a plurality of individual electrical circuits integrated on contiguous chip areas of said wafer of semiconductor material, each such integrated circuit terminating in a plurality of conductor pads within said chip area, and a beam lead electrically and physically connected to each said conductor pad at one end and overlying one surface of said wafer and extending to and over a contiguous chip area at its other end; the method of treating the other surface of said wafer, in which said circuits are not visible on said other surface and wherein said semiconductor material displays properties, with regard to the transmission of radiant energy, different from at least some of the components of said circuit, comprising the steps of directing said given form of radiant energy through said wafer from said one surface to said other surface to produce a pattern detectable on said other surface; and treating said other surface of said wafer along lines determined by reference to said detectable pattern, thereby to provide visible reference means on said other surface to facilitate dividing said wafer into individual chips. --.

Signed and sealed this 10th day of October 1972.

(SEAL)
Attest:

EDWARD M. FLETCHER, JR.
Attesting Officer

ROBERT GOTTSCHALK
Commissioner of Patents